T. A. Dugdale.
Hand Loom.

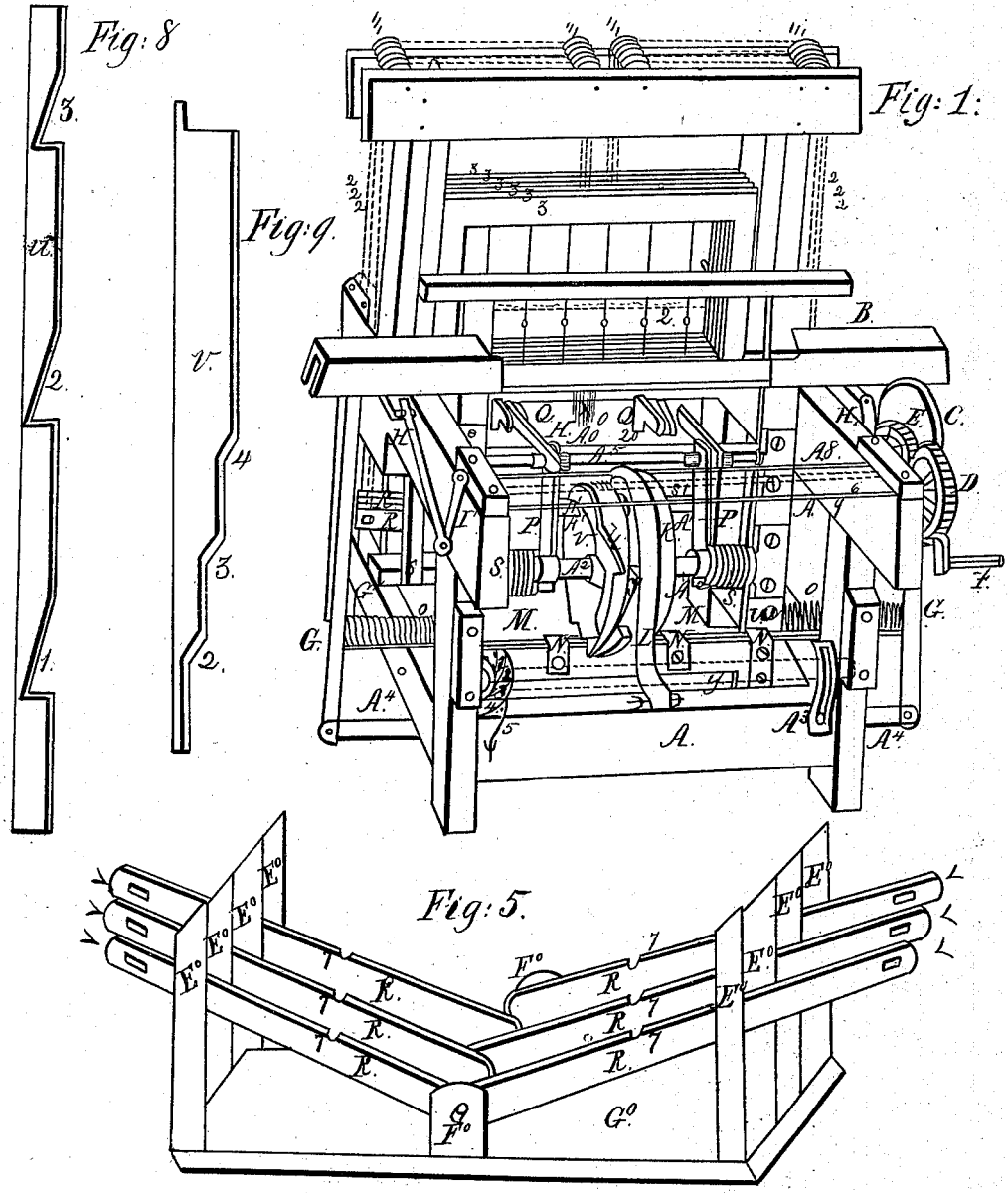

N° 68,969. Patented Sep. 17, 1867.

Witnesses:
John Finley
William P. Wilson

Inventor:
Thomas A Dugdale

United States Patent Office.

THOMAS A. DUGDALE, OF RICHMOND, INDIANA.

*Letters Patent No. 68,969, dated September 17, 1867; antedated September 7, 1867.*

IMPROVEMENT IN HAND-LOOMS.

The Schedule referred to in these Letters Patent and making part of the same.

Be it known that I, THOMAS A. DUGDALE, of the city of Richmond, county of Wayne, and State of Indiana, have invented new and useful Improvements in Hand-Looms; and I do hereby declare that the following is a full, clear, and exact description of the construction and operation of the same, reference being had to the annexed drawings, making a part of this specification, in which—

Figure 1 is a perspective view.

Figure 5 represents the shedding levers.

Figure 8 is a view of one of the side flanges of the wheel straightened out.

Figure 9 is a like view of another flange.

Figure 3:
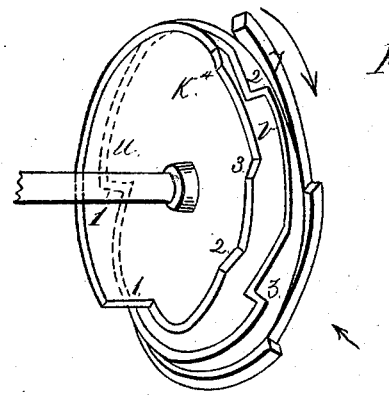
Figure 3 represents one side of a peculiarly constructed wheel for operating the picking and shedding devices.
Figure 4:
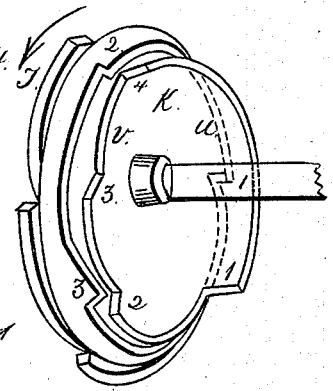
Figure 4 represents the other side of the wheel, shown in fig. 3.
Figure 2:
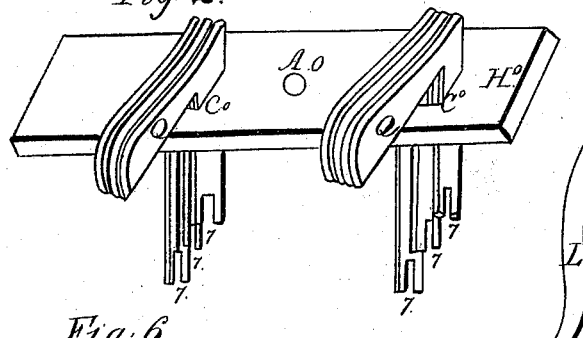
Figure 2 is a cross-piece.
Figure 7:
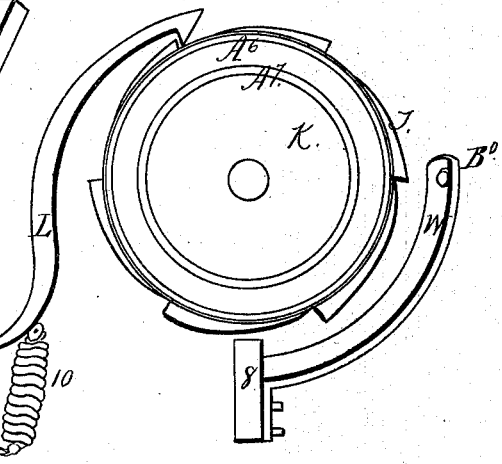
Figure 7 represents the wheel, (inside views,) with its operative mechanism and grooves $A^6$ and $A^7$.
Figure 6:
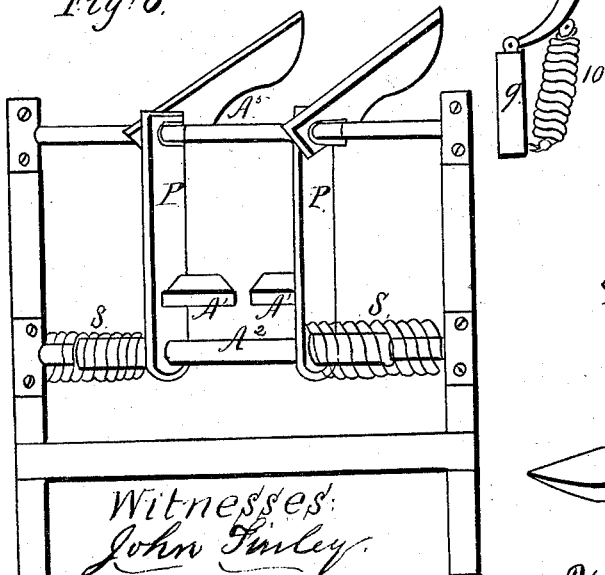
Figure 6 represents a section of the lay (the shuttle-race and cam being removed.)
Figure 10:
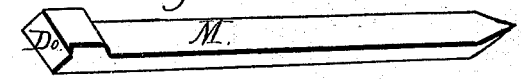
Figures 10 and 11 are sliding pieces for operating the picker-staff.
Figure 11:
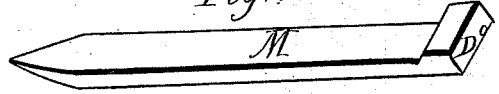

A, in fig. 1, is the frame; B, the lay; C, a fly-wheel; D, a cog-wheel; E, a cog-wheel; F, a crank; G G, the picker-staff; H H are pitmen; I is a crank; K is a wheel with flanges on the sides, and ratchet-teeth on its edge, parts of which are shown at figs. 3, 4, and 7; L is a hook which operates the ratchet-wheel, also shown at fig. 7; M M are sliding-bars for operating the picker-staffs, also shown at figs. 10 and 11; N N N N are clamps in which bars M M slide, one of which is not seen, it being behind the frame; O O are springs to draw back the picker-staffs; P P are pieces sliding on rods $A^2$ $A^3$, and for working the treadles, an enlarged view of these pieces being shown at fig. 6; Q Q are treadles, also shown at fig. 2; R R, in fig. 1, are levers, more plainly shown at R R R R R R in fig. 5; S S, in figs. 1 and 6, are springs to press the sliding pieces P P against the flanges on the wheel K; T is a ratchet; U is a flange attached to one side of wheel K, and provided with offsets and inclined planes, (see figs. 3, 4, and 8.) V is a flange with an offset and three rises (shown at figs 3, 4, and 9;) W, in fig. 7, is a piece secured to a cross-bar of the lay, (said bar is not seen in fig. 1,) and for pulling down the harness as the lay is drawn forward; X, strings for pulling down the harness; Y, in fig. 1, is the cloth-roller, represented by two red lines; Z, in fig. 1, is the roller from which the chain or yarn is supplied, also represented by red lines, the lower edge of which is seen behind the lay; 1 1, in fig. 1, are rollers; 2 2 are cords attached to the harness-frames 3 3, and which pass over the rollers 1 1, and are attached to the levers R in the slot V; 3 3 are the frames for the harness; 4 and 5 are an ordinary ratchet and spring for actuating the cloth-roller; 6, represented in red, is the breast-beam; 7 7, in fig. 2, are slots in the lower end of the uprights or treadles Q Q; 8, in fig. 7, is a section of a cross-piece of the lay, (not seen in fig. 1,) to which is attached the piece W; 9, in fig. 7, is a section of the lower cross-piece at the front of the loom, to which is attached the hook L, (see A in fig. 1;) 10 is a spring attached to hook L, and to the cross-piece A; A1 A1, in fig. 1, are bevelled pieces attached to the sliding pieces P P; A2 A2 is a shaft supported in the lay, upon which the wheel K is secured, and upon which the lower sleeve of the sliding pieces P P slide: A3 is a piece to press on the cloth-roller; A4 A4, pieces secured to the bottom of the lay to support the picker-staffs, and upon which they vibrate; A5 is a shaft which supports and guides the upper end of the sliding pieces; A6, in fig. 7, shows the groove in which the straight edge of the flange U is to be placed when formed into a circle; A7 shows the groove in which the straight edge of the flange V is to be placed when formed into a circle; G O, in fig. 1, is a cross-piece, also seen in fig. 5; H O, in figs. 1 and 2, is also a cross-piece.

Construction.

The frame of my loom is made, as other hand-looms, of good timber, secured by bolts at the joints, and may be made three and a half feet wide, five feet long, and three feet high. The width may be varied to suit the kind of goods intended to be woven. When the loom is made wide the picker-staffs may be placed inside the frame. The springs used may be ordinary spiral springs; the harness the same as is used in other looms. The shafts A2 and A5 are turned out of good round iron. The sliding pieces are made of cast iron or other suitable material, and have hubs attached at the proper places, and are bored smooth so as to slide freely on the shafts A5 and A2. The shaft A2 has a journal at each end running in bearings in the lay. The pieces A1 A1 are bevelled to correspond with the rises in the flanges U V, and are very smooth. The bevelled ends D O D O of the two sliding pieces M M are made of steel, and very smooth, and correspond with the inclines 1 2 3, as seen at fig. 8. The wheel K is made by cutting a round plate of iron or brass, with six ratchet-teeth on its edge, and turning two grooves on each side of the wheel, viz, the grooves represented by A6 and A7, and with corresponding grooves on the opposite side of the wheel. I then make two pieces like the one seen at U in fig. 8, form them into circles, and secure one on one side of the wheel in the groove A6, and the other one on the opposite side of the wheel, in a corresponding groove, taking care to have the offsets and inclines to come exactly between those on the opposite side of the wheel. Next I form the piece V, as seen at fig. 9, bend it into a circle, and secure it on one side of the wheel in the groove A7. I then form another so that the rises 2, 3, and 4 will be reversed, and secure it to the opposite side of the wheel in a corresponding groove, taking care that the offset 1, at the highest part of the flange, shall come opposite to the rise 4 on the other side of the wheel, and also opposite to one of the offsets in flange U, or on a line from the centre of the wheel. The wheel is then secured on the shaft A2 A2. The piece G O, at fig. 5, should have the uprights E O and F O well secured to it by being mortised into it. A pin is put through the back end of the levers, and through the uprights F O F O, for the levers to vibrate on. I do not confine myself to making my wheel of the number of separate pieces above described, as it may be formed in two halves and cast in that way and be put together. Neither do I confine myself to the use of the uprights or treadles Q Q, as levers may be substituted and be hung below the levers R R, and the same may be connected by cords which will pull down the levers R R, in place of pushing them down, as is the case with the treadles Q Q.

The operation is as follows: Power is applied to the crank F on the wheel D, which gives motion to the wheel E, and fly-wheel C, and crank I, which gives motion to the lay by means of the pitmen H H. By drawing the lay toward the operator the hook L will catch on the ratchets T, and as the lay is moved from the operator the wheel K will be moved toward him, when one of the inclined planes in the flange U will force out one of the pieces M M, throwing out the picker-staff on one side of the loom, the wheel stopping with the piece M just half way between the two inclined planes, while the other piece M has dropped back into the inclined plane, and half way between two inclined planes on the opposite side of the wheel, preparatory to rising the plane upon which it is resting, the same effect being produced alternately on each side of the wheel. The shuttle is thrown from one side of the loom to the other by means of the picker-staffs thus operated; (I will here remark that my loom may be worked by applying the hand to the top of the lay B, dispensing with the use of the shafts, cog-wheels, fly-wheel, and pitmen, when a cheaper loom is desired, though attaining less speed;) and as the wheel K revolves toward the operator at the front of the loom, one of the pieces A1 having ascended, the rises 2, 3, and 4 in the flange V will stand just above the rise 4, and hold one of the sliding pieces P out of the way of the treadles Q Q. The other piece, A1, at the same time, drops back along the offset 1, and just before it rises at 2, as the lay is forced back, it operates one of the treadles Q; at another beat of the lay it is forced up the rise 2, and just before rising at 3 it works another of the treadles Q; at another beat it rises 3 and works another treadle at Q, and at another beat it rises 4 and is out of the way. The sliding piece on the opposite side of the wheel performs the same functions on the other treadles.

Having fully described my invention, what I claim as my invention, and desire to secure by Letters Patent of the United States, is—

1. The wheel K, for operating the picking and harness mechanism, the said wheel being formed of the flanges U U, V V, and ratchets T.

2. The combination of the wheel K, hook L, and pieces M M, with the lay B.

3. The combination of the wheel K and sliding pieces P P, and shafts A2 and A5, and springs S S, when arranged, constructed, and operated substantially as and for the purposes described.

THOMAS A. DUGDALE.

Witnesses:
JOHN FINLEY,
WILLIAM P. WILSON.